United States Patent
Sasaki

(10) Patent No.: US 9,551,595 B2
(45) Date of Patent: Jan. 24, 2017

(54) INDUCTION DETECTING TYPE ROTARY ENCODER

(71) Applicant: MITUTOYO CORPORATION, Kawasaki, Kanagawa (JP)

(72) Inventor: Kouji Sasaki, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 18 days.

(21) Appl. No.: 14/677,228

(22) Filed: Apr. 2, 2015

(65) Prior Publication Data

US 2015/0292910 A1    Oct. 15, 2015

(30) Foreign Application Priority Data

Apr. 9, 2014 (JP) .................. 2014-080139

(51) Int. Cl.
 *G01D 5/20* (2006.01)
(52) U.S. Cl.
 CPC .................. *G01D 5/2046* (2013.01)
(58) Field of Classification Search
 None
 See application file for complete search history.

(56) References Cited

U.S. PATENT DOCUMENTS

| | | | | |
|---|---|---|---|---|
| 7,081,746 B2* | 7/2006 | Aoki | ..................... | G01D 5/2086 324/207.15 |
| 2005/0274034 A1* | 12/2005 | Hayashida | ............... | G01B 3/18 33/813 |
| 2010/0102803 A1* | 4/2010 | Kobayashi | .......... | G01D 5/2013 324/207.25 |
| 2010/0231206 A1* | 9/2010 | Kobayashi | .......... | G01D 5/2046 324/207.25 |
| 2011/0109304 A1* | 5/2011 | Suzuki | .................. | H02K 24/00 324/207.25 |
| 2012/0068693 A1* | 3/2012 | Ocket | .................. | G01D 5/2046 324/207.17 |
| 2013/0069637 A1* | 3/2013 | Kobayashi | ............. | G01D 5/208 324/207.17 |
| 2013/0187639 A1 | 7/2013 | Sasaki | | |
| 2013/0271122 A1* | 10/2013 | Kino | ....................... | G01B 7/30 324/207.25 |

FOREIGN PATENT DOCUMENTS

JP    1715298 A2 * 10/2006 ........... G01D 5/2086
JP    2013-152163    8/2013

* cited by examiner

*Primary Examiner* — Jermele M Hollington
*Assistant Examiner* — Douglas X Rodriguez
(74) *Attorney, Agent, or Firm* — Rankin, Hill & Clark LLP

(57) ABSTRACT

An induction detecting type rotary encoder includes: a stator; a rotor disposed opposite the stator; a first transmitting coil that is provided in the stator and includes a first inner circumference coil and a first outer circumference coil; a second transmitting coil that is provided in the stator and includes a second inner circumference coil and a second outer circumference coil; first and second receiving coils provided in the stator; and first and second magnetic flux coupling bodies provided in the rotor. The closest distance between the first inner circumference coil and the second magnetic flux coupling body is shorter than that between the first outer circumference coil and the second magnetic flux coupling body. The closest distance between the second inner circumference coil and the first magnetic flux coupling body is shorter than that between the second outer circumference coil and the first magnetic flux coupling body.

6 Claims, 12 Drawing Sheets

INDUCTION DETECTING TYPE ROTARY ENCODER

CROSS-REFERENCE TO RELATED APPLICATION

This non-provisional application claims priority under 35 U.S.C. §119(a) from Japanese Patent Application No. 2014-080139, filed on Apr. 9, 2014, the entire contents of which are incorporated herein by reference.

BACKGROUND OF THE INVENTION

Field of the Invention

The present invention relates to an induction detecting type rotary encoder that measures a rotation angle on the basis of magnetic flux coupling between wirings provided in a rotor and a stator.

Induction detecting type rotary encoders include a stator and a rotor: the stator has a transmitting coil and a receiving coil, and the rotor has a magnetic flux coupling body. In such an induction detecting type rotary encoder, transmission current flows through the transmitting coil while altering its flowing direction periodically. Due to this transmission current flowing through the transmitting coil, the magnetic field is generated. Then, the magnetic flux coupling body generates inductive current on the basis of this magnetic field. In turn, the receiving coil detects an inductive voltage on the basis of the magnetic field generated from the inductive current flowing through the magnetic flux coupling body.

JP 2013-152163 A discloses an exemplary induction detecting type rotary encoder that has a stator in which a plurality of transmitting coils and receiving coils are stacked with respective insulating layers therebetween. In addition, it has a rotor in which a plurality of magnetic flux coupling bodies are stacked with an insulating layer therebetween.

Because of the respective stacked structures of the transmitting coils, the receiving coils and the magnetic flux coupling bodies, the induction detecting type rotary encoder disclosed in JP 2013-152163 A has a compact body.

SUMMARY OF THE INVENTION

FIG. 8 is a plan view illustrating an exemplary configuration of a first magnetic flux coupling body in an induction detecting type rotary encoder. FIG. 9 is a plan view illustrating an exemplary configuration of a second magnetic flux coupling body. As illustrated in FIG. 8, a first magnetic flux coupling body 41a has a continuous toothed pattern that periodically alters the shape at pitches λ1 in a rotational direction of a rotor 15. As illustrated in FIG. 9, a second magnetic flux coupling body 41b has a plurality of island-shaped patterns each formed like a rectangular loop; the island-shaped patterns are arranged separately from one another at regular pitches λ2 in the rotational direction of the rotor 15.

In the first magnetic flux coupling body 41a illustrated in FIG. 8, a length b of each concave portion 411a corresponding to the inner segment is shorter than a length a of each convex portion 412a corresponding to the outer segment. In the second magnetic flux coupling body 41b illustrated in FIG. 9, a length d of each inner side 411b corresponding to the inner segment is shorter than a length c of each outer side 412b corresponding to the outer segment. These length differences prohibit a complete cancellation of the inductive currents, possibly causing a crosstalk.

A mechanism to cause a crosstalk as described above will be described below.

FIG. 12A schematically illustrates inductive currents in the first magnetic flux coupling body 41a and the second magnetic flux coupling body 41b which are generated from a current Id1 flowing through a first transmitting coil 35a. In the example illustrated in FIG. 12A, the current Id1 flows clockwise along the inner and outer circumferences of the first transmitting coil 35a. Due to this current Id1, inductive currents Id21 and Id22 flow counterclockwise through the current paths along the inner and outer circumferences of each of the first magnetic flux coupling body 41a and the second magnetic flux coupling body 41b. In this case, in the first magnetic flux coupling body 41a, the inductive currents Id21 and Id22 are not mutually cancelled because the current path is not looped. In contrast, in the second magnetic flux coupling body 41b, the inductive currents Id21 and Id22 are mutually cancelled because each current path is looped.

In the second magnetic flux coupling body 41b, the length d of each inner side 411b is shorter than the length c of each outer side 412b, in which case the inductive current Id22 that flows through the current path on the inner side 411b is smaller than the inductive current Id21 that flows through the current path on the outer side 412b. This inductive current difference (Id21−Id22) prohibits a complete mutual cancellation between the inductive currents Id21 and Id22, possibly causing a crosstalk.

FIG. 12B schematically illustrates inductive currents in the first magnetic flux coupling body 41a and the second magnetic flux coupling body 41b which are generated from a current Id1 flowing through a second transmitting coil 35b. In the example illustrated in FIG. 12B, the current Id1 flows clockwise and counterclockwise along the outer and inner circumferences, respectively, of the second transmitting coil 35b.

Due to the current Id1, the inductive currents Id21 flow counterclockwise through the outer current paths in the first magnetic flux coupling body 41a and the second magnetic flux coupling body 41b. In addition, the inductive currents Id22 flow clockwise through the inner current paths therein. In this case, in the first magnetic flux coupling body 41a, the inductive currents Id21 and Id22 are mutually cancelled on the non-looped current path. In contrast, in the second magnetic flux coupling body 41b, the inductive currents Id21 and Id22 are not mutually cancelled on the looped current paths.

In the first magnetic flux coupling body 41a, the current path length b of each concave portion 411a is shorter than the current path length a of each convex portion 412a, in which case the inductive current Id22 that flows through the current path in each concave portion 411a is smaller than the inductive current Id21 that flows through the current path in each convex portion 412a. This inductive current difference (Id21−Id22) prohibits a complete mutual cancellation between the inductive currents Id21 and Id22, possibly causing a crosstalk.

An object of the present invention is to provide an induction detecting type rotary encoder that reduces a crosstalk occurring when inductive currents are cancelled in each magnetic flux coupling body, thereby enabling highly accurate location detection.

An induction detecting type rotary encoder of the present invention, which addresses problems as described above, includes: a stator; and a rotor disposed opposite the stator so as to be rotatable around a rotation axis. A first transmitting coil is provided in the stator and includes a first inner circumference coil and a first outer circumference coil that allow respective currents to flow therethrough in the same rotational direction while being centered on the rotation axis. A second transmitting coil is provided in the stator and includes a second inner circumference coil and a second outer circumference coil that allow respective currents to flow therethrough in different rotational directions while being centered on the rotation axis. A first receiving coil is provided in the stator and formed in a circular first region at a center of which the rotation axis is positioned. A second receiving coil is provided in the stator and formed in a circular second region that is disposed over or under the first region in a direction along the rotation axis. A first insulating layer is interposed between the first receiving coil and the second receiving coil. A first magnetic flux coupling body is provided in the rotor and formed in a circular third region at a center of which the rotation axis is positioned. A second magnetic flux coupling body is provided in the rotor and formed in a circular fourth region that is disposed over or under the third region in the direction along the rotation axis. A second insulating layer is interposed between the first magnetic flux coupling body and the second magnetic flux coupling body. In this configuration, the closest distance between the first inner circumference coil and the second magnetic flux coupling body is shorter than the closest distance between the first outer circumference coil and the second magnetic flux coupling body. The closest distance between the second inner circumference coil and the first magnetic flux coupling body is shorter than the closest distance between the second outer circumference coil and the first magnetic flux coupling body.

In a configuration as described above, a current that flows through a first transmitting coil generates a magnetic field. Due to the magnetic flux coupling based on this magnetic field, inductive currents flow through a first magnetic flux coupling body. Likewise, a current that flows through a second transmitting coil generates a magnetic field. Due to the magnetic flux coupling based on this magnetic field, inductive currents flow through a second magnetic flux coupling body. In this case, the magnetic flux coupling from a first inner circumference coil in the first transmitting coil to the second magnetic flux coupling body is greater than the magnetic flux coupling from a first outer circumference coil in the first transmitting coil to the second magnetic flux coupling body. Consequently, even if the respective current paths on the inner and outer circumferences of the second magnetic flux coupling body differ in length from each other, the difference between the inductive currents on the current paths which would be caused due to this length difference is reduced. Likewise, the magnetic flux coupling from a second inner circumference coil in the second transmitting coil to the first magnetic flux coupling body is greater than the magnetic flux coupling from a second outer circumference coil in the second transmitting coil to the first magnetic flux coupling body. Consequently, even if the respective current paths on the inner and outer circumferences of the first magnetic flux coupling body differ in length from each other, the difference between the inductive currents on the current paths which would be caused due to this length difference is reduced.

In the induction detecting type rotary encoder of the present invention, a spacing between the first inner circumference coil and the second magnetic flux coupling body may be provided so as to become smaller, in the direction along the rotation axis, than a spacing between the first outer circumference coil and the second magnetic flux coupling body. In addition, a spacing between the second inner circumference coil and the first magnetic flux coupling body may be provided so as to become smaller, in the direction along the rotation axis, than a spacing between the second outer circumference coil and the first magnetic flux coupling body.

According to a configuration as described above, it is possible to reduce the difference between the inductive currents on the inner and outer circumferences of a first magnetic flux coupling body which would be caused due to the difference in length between the current paths thereon and the difference between the inductive currents on the inner and outer circumferences of a second magnetic flux coupling body which would be caused due to the difference in length between the current paths thereon by adjusting the respective depths (the respective locations in a direction along a rotation axis) at which a first inner circumference coil, a first outer circumference coil, a second inner circumference coil and a second outer circumference coil are provided.

In the induction detecting type rotary encoder of the present invention, the first transmitting coil and at least one of the first receiving coil and the second receiving coil may be provided on the same layer, and the second transmitting coil and at least one of the first receiving coil and the second receiving coil may be provided on the same layer. According to a configuration as described above, it is possible to form transmitting coils without the need to increase the number of receiving coils in a stator.

In the induction detecting type rotary encoder of the present invention, a spacing between the first inner circumference coil and the second magnetic flux coupling body may be provided so as to become smaller, in a direction perpendicular to the rotation axis, than a spacing between the first outer circumference coil and the second magnetic flux coupling body. In addition, a spacing between the second inner circumference coil and the first magnetic flux coupling body may be provided so as to become smaller, in the direction perpendicular to the rotation axis, than a spacing between the second outer circumference coil and the first magnetic flux coupling body.

According to a configuration as described above, it is possible to reduce the difference between the inductive currents on the inner and outer circumferences of a second magnetic flux coupling body which would be caused due to the difference in length between the current paths thereon by adjusting the locations of a first inner circumference coil and a first outer circumference coil in a direction perpendicular to a rotation axis. Likewise, it is possible to reduce the difference between the inductive currents on the inner and outer circumferences of a first magnetic flux coupling body which would be caused due to the difference in length between the current paths thereon by adjusting the locations of a second inner circumference coil and a second outer circumference coil in a direction perpendicular to the rotation axis.

In the induction detecting type rotary encoder of the present invention, each of the first magnetic flux coupling body and the first receiving coil may be provided such that its shape periodically alters at first pitches in the rotational direction while being centered on the rotation axis. In addition, each of the second magnetic flux coupling body and the second receiving coil may be provided such that its shape periodically alters at second pitches in the rotational direction while being centered on the rotation axis, each second pitch being longer than each first pitch. According to a configuration as described above, location detection using both a first magnetic flux coupling body and a first receiving coil can be made more accurately than location detection using both a second magnetic flux coupling body and a second receiving coil.

In the induction detecting type rotary encoder of the present invention, the first magnetic flux coupling body has a pattern formed of convex portions and concave portions arranged periodically at the first pitches which contains an inner circumference current path and an outer circumference current path. In addition, the second magnetic flux coupling body may have a plurality of island-shaped patterns arranged periodically at the second pitches, each island-shaped pattern forming a looped current path. According to a configuration as described above, it is possible to reduce a crosstalk occurring when inductive currents are cancelled in each of a first magnetic flux coupling body and a second magnetic flux coupling body.

DETAILED DESCRIPTION OF THE EMBODIMENTS

First Embodiment

Figure 1:
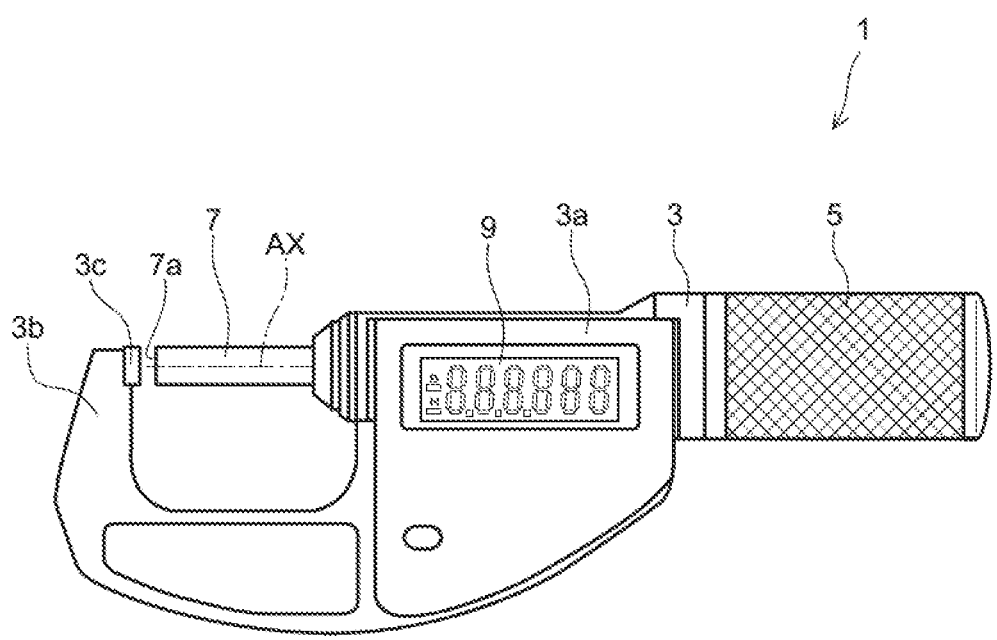
FIG. 1 is a front view illustrating an exemplary digital micrometer.

A first embodiment of the present invention will be described below with reference to the accompanying drawings. In the following description, the same reference characters are given to identical members, and members that have already been described will not be described again as appropriate.

FIG. 1 is a front view illustrating an exemplary digital micrometer that employs an induction detecting type rotary encoder in the first embodiment.

As illustrated in FIG. 1, a digital micrometer 1 includes a frame 3, a thimble 5, a spindle 7 and a display 9. The frame 3 has a main body 3a and an anvil section 3b; the main body 3a supports both the thimble 5 and the spindle 7, and the anvil section 3b is positioned a predetermined distance away from the main body 3a. The thimble 5 is rotatably attached to the main body 3a of the frame 3; the spindle 7 is rotatably supported as a gauge head by the main body 3a of the frame 3.

The spindle 7 has an end 7a that protrudes from the main body 3a of the frame 3 toward the anvil section 3b; the anvil section 3b has an anvil 3c that faces the end 7a of the spindle 7. The other end of the spindle 7 is inserted into the main body 3a of the frame 3, and a feed screw (not illustrated in FIG. 1) is formed at this end of the spindle 7. This feed screw is inserted into a nut (not illustrated in FIG. 1) provided in the thimble 5.

The display 9 is provided on the exterior of the main body 3a of the frame 3. The display 9 is implemented using, for example, a liquid crystal display panel that shows numeric values and the like in accordance with a segment scheme. With the structure described above, when the thimble 5 is rotated in the forward direction, the spindle 7 moves toward the anvil 3c along the axis of the spindle 7 (rotation axis AX). The distance between the spindle 7 and the anvil 3c thereby decreases. When the thimble 5 is rotated in the reverse direction, the spindle 7 moves away from the anvil 3c along the axis of the spindle 7 (rotation axis AX). The distance between the spindle 7 and the anvil 3c thereby increases.

When the size of an object is measured, the object is placed between the end 7a of the spindle 7 and the anvil 3c, and held therebetween by rotating the thimble 5 in the forward direction. The distance between the end 7a of the spindle 7 and the anvil 3c is shown by the display 9 as a measurement value.

Next, a configuration of the induction detecting type rotary encoder in this embodiment will be described.

Figure 2:
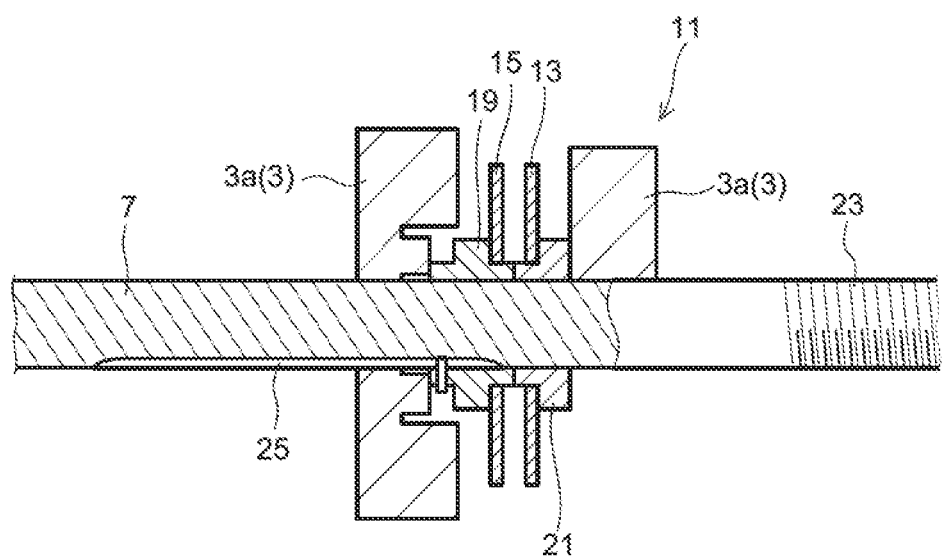
FIG. 2 is a cross section view illustrating an exemplary configuration of an induction detecting type rotary encoder in a first embodiment of the present invention.

FIG. 2 is a cross section view illustrating an exemplary configuration of the induction detecting type rotary encoder in this embodiment.

As illustrated in FIG. 2, an induction detecting type rotary encoder 11 is installed in the main body 3a of the frame 3.

The induction detecting type rotary encoder 11 includes a stator 13 and a rotor 15; the stator 13 is fixed to the main body 3a of the frame 3 with a stator bush 21 therebetween, and the rotor 15 is placed opposite the stator 13 so as to be rotatable around the rotation axis AX. In addition, the rotor 15 is fixed to a end surface of a cylindrical rotor bush 19. The spindle 7 is inserted into both the rotor bush 19 and the stator bush 21.

A feed screw 23 that is inserted into the nut disposed inside the thimble 5 is formed on the surface of the spindle 7. A key groove 25 is formed on the surface of the spindle 7 in its longitudinal direction (the movement direction of the spindle 7). An end of a pin 27 fixed to the rotor bush 19 fits into the key groove 25. When the spindle 7 rotates, its rotational force is transmitted to the rotor bush 19 through the pin 27 whereby the rotor 15 rotates. Specifically, the rotor 15 rotates together with the spindle 7. Since the pin 27 is not fixed to the key groove 25, the rotor 15 rotates without involving the movement of the spindle 7. The stator bush 21 does not rotate together with the spindle 7. In other words, when the spindle 7 rotates, the stator 13 stays fixed.

Next, configurations of the stator 13 and the rotor 15 will be described.

Figure 3:
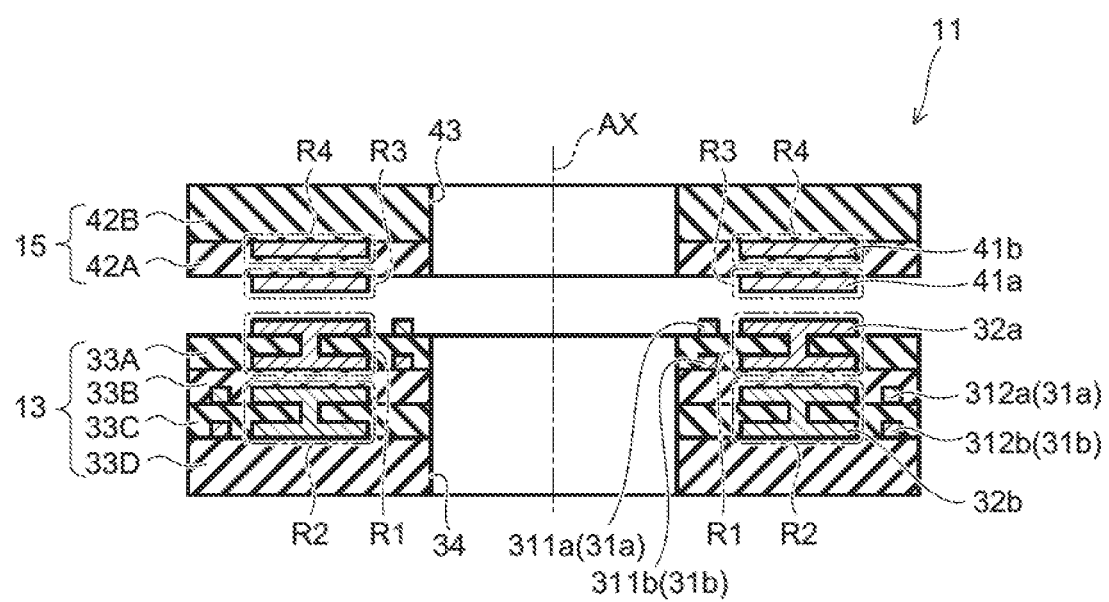
FIG. 3 is a schematic cross section view illustrating exemplary configurations of a stator and a rotor.

FIG. 3 is a schematic cross section view illustrating exemplary configurations of a stator and a rotor.

As illustrated in FIG. 3, the stator 13 includes stacked insulating layers 33A, 33B, 33C and 33D. The insulating layers 33A, 33B, 33C and 33D are stacked in this order in the direction away from the rotor 15. A hole 34 that allows the spindle 7 to pass therethrough is formed in all of the insulating layers 33A, 33B, 33C and 33D.

The rotor 15 includes stacked insulating layers 42A and 42B. The insulating layers 42A and 42B are stacked in this order in the direction away from the stator 13. A hole 43 that allows the spindle 7 to pass therethrough is formed in both of the insulating layers 42A and 42B.

The stator 13 is provided with a first receiving coil 32a and the second receiving coil 32b. The first receiving coil 32a is provided in a circular first region R1 at the center of which the rotation axis AX is positioned. A part (first layer wiring) of the first receiving coil 32a is provided on the surface of the insulating layer 33A which faces the rotor 15; the other part (second layer wiring) is provided between the insulating layers 33A and 33B. Both parts are interconnected through a through-hole or a via formed across the insulating layer 33A.

The second receiving coil 32b is provided in a circular second region R2 that is disposed under the first region R1 in a direction along the rotation axis AX. The second receiving coil 32b is stacked on the first receiving coil 32a with the insulating layer 33B therebetween. Apart (third layer wiring) of the second receiving coil 32b is provided between the insulating layers 33B and 33C; the other part (fourth layer wiring) is provided between the insulating layers 33C and 33D. Both parts are interconnected through a through-hole or a via formed across the insulating layer 33C.

The stator 13 is further provided with a first transmitting coil 31a and a second transmitting coil 31b. The first transmitting coil 31a has a first inner circumference coil 311a and a first outer circumference coil 312a that are provided on inner and outer circumferences, respectively, of the stator 13. Each of the first inner circumference coil 311a and the first outer circumference coil 312a is formed in a circular shape at the center of which the rotation axis AX is positioned, and current flows through them in the same rotational direction while being centered on the rotation axis AX. The current that flows through the first transmitting coil 31a alters its flow direction periodically; a magnetic field generated by this current is irradiated onto a first magnetic flux coupling body 41a provided in the rotor 15.

The second transmitting coil 31b has a second inner circumference coil 311b and a second outer circumference coil 312b that are provided on inner and outer circumferences, respectively, of the stator 13. Each of the second inner circumference coil 311b and the second outer circumference coil 312b is formed in a circular shape at the center of which the rotation axis AX is positioned, and current flows through them in different rotational directions while being centered on the rotation axis AX. The current that flows through the second transmitting coil 31b alters its flow direction periodically; a magnetic field generated by this current is irradiated onto a second magnetic flux coupling body 41b provided in the rotor 15.

The rotor 15 is provided with the first magnetic flux coupling body 41a and the second magnetic flux coupling body 41b. The first magnetic flux coupling body 41a is formed in a circular third region R3 at the center of which the rotation axis AX is positioned and on the surface of the insulating layer 42A which faces the stator 13.

The second magnetic flux coupling body 41b is formed in a circular fourth region R4 that is disposed over the third region R3 in a direction along the rotation axis AX. The second magnetic flux coupling body 41b is formed between the insulating layers 42A and 42B. Thus, the second magnetic flux coupling body 41b is stacked on the first magnetic flux coupling body 41a with the insulating layer 42A therebetween.

In this embodiment, the first region R1 is defined between the second region R2 and the third region R3; the third region R3 is defined between the first region R1 and the fourth region R4. Consequently, the first receiving coil 32a is positioned opposite the first magnetic flux coupling body 41a. Furthermore, both the first receiving coil 32a and the first magnetic flux coupling body 41a are arranged between the second receiving coil 32b and the second magnetic flux coupling body 41b. Since this arrangement can increase the intensity of a signal which will be received by the first receiving coil 32a, it is preferred when the measurement accuracy is sensitive to a signal received by the first receiving coil 32a.

An operation of the induction detecting type rotary encoder 11 will be described below.

In the induction detecting type rotary encoder 11, a transmission current flows through the first transmitting coil 31a while altering the flow direction periodically. Then, a magnetic field generated from this transmission current is irradiated onto the first magnetic flux coupling body 41a formed in the rotor 15. Due to the magnetic flux coupling, an inductive current flows through the first magnetic flux coupling body 41a. In turn, the first receiving coil 32a detects an inductive voltage on the basis of the magnetic field generated from the inductive current flowing through the first magnetic flux coupling body 41a.

In the induction detecting type rotary encoder 11, a transmission current flows through the second transmitting coil 31b while altering the flow direction periodically. Then, a magnetic field generated from this transmission current is irradiated onto the second magnetic flux coupling body 41b formed in the rotor 15. Due to the magnetic flux coupling, an inductive current flows through the second magnetic flux coupling body 41b. In turn, the second receiving coil 32b detects an inductive voltage on the basis of the magnetic field generated from the inductive current flowing through the second magnetic flux coupling body 41b.

In the induction detecting type rotary encoder 11 configured above, the closest distance between the first inner circumference coil 311a and the second magnetic flux coupling body 41b is set to be shorter than the closest distance between the first outer circumference coil 312a and the second magnetic flux coupling body 41b. Furthermore, the closest distance between the second inner circumference coil 311b and the first magnetic flux coupling body 41a is set to be shorter than the closest distance between the second outer circumference coil 312b and the first magnetic flux coupling body 41a.

In order to satisfy the above distance relationship in this embodiment, the first inner circumference coil 311a and the first outer circumference coil 312a are provided on different layers. Furthermore, the second inner circumference coil 311b and the second outer circumference coil 312b are provided on different layers.

More specifically, in the example illustrated in FIG. 3, the first inner circumference coil 311a is provided on the surface of the insulating layer 33A which faces the rotor 15; the first outer circumference coil 312a is provided between the insulating layers 33B and 33C. Furthermore, the second inner circumference coil 311b is provided between the insulating layers 33A and 33B; the second outer circumference coil 312b is provided between the insulating layers 33C and 33D.

With the above arrangement, the distance between the first inner circumference coil 311a and the second magnetic flux coupling body 41b is set to be shorter, in a direction along the rotation axis AX, than the distance between the first outer circumference coil 312a and the second magnetic flux coupling body 41b. In addition, the distance between the second inner circumference coil 311b and the first magnetic flux coupling body 41a is set to be shorter, in the direction along the rotation axis AX, than the distance between the second outer circumference coil 312b and the first magnetic flux coupling body 41a.

In this embodiment, the first inner circumference coil 311a and a part (first layer wiring) of the first receiving coil 32a are provided on the same layer; the first outer circumference coil 312a and a part (third layer wiring) of the second receiving coil 32b are provided on the same layer. Furthermore, the second inner circumference coil 311b and the other part (second layer wiring) of the first receiving coil 32a are provided on the same layer; the second outer circumference coil 312b and the other part (fourth layer wiring) of the second receiving coil 32b are provided on the same layer. With this arrangement, two transmitting coils (first transmitting coil 31a and second transmitting coil 31b) and two receiving coils (first receiving coil 32a and second receiving coil 32b) in the stator 13 can be implemented using a four-layer-structure. Thus, the structure in this embodiment does not involve adding any additional layer. However, this example is not limiting, and any other structure may be employed provided that the first transmitting coil 31a and at least one of the first receiving coil 32a and the second receiving coil 32b are provided on the same layer and the second transmitting coil 31b and at least one of the first receiving coil 32a and the second receiving coil 32b are provided on the same layer.

Next, a description will be given of respective planar shapes of the first transmitting coil 31a, the second transmitting coil 31b, the first receiving coil 32a, the second receiving coil 32b, the first magnetic flux coupling body 41a and the second magnetic flux coupling body 41b.

Figure 4:
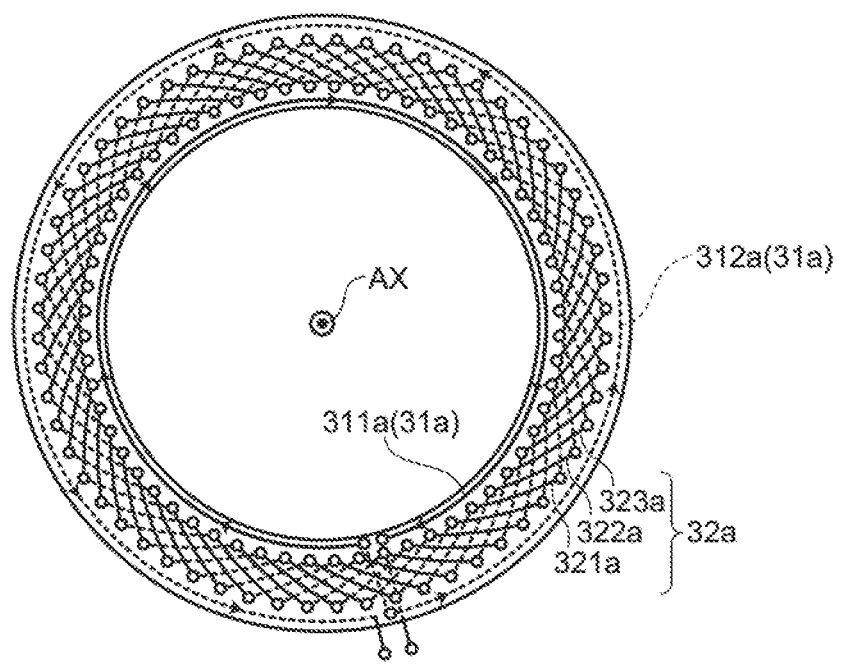
FIG. 4 is a plan view illustrating an exemplary first transmitting coil and first receiving coil.

FIG. 4 is a plan view illustrating an exemplary first transmitting coil and first receiving coil.

As illustrated in FIG. 4, the first inner circumference coil 311a and the first outer circumference coil 312a in the first transmitting coil 31a are provided coaxially with the rotation axis AX of the spindle 7. Specifically, the first inner circumference coil 311a is provided on the surface of the insulating layer 33A which faces the rotor 15; the first outer circumference coil 312a is provided on the surface of the insulating layer 33A opposite the rotor 15. Each of the first inner circumference coil 311a and the first outer circumference coil 312a has a substantially circular current path. Current flows in the same direction through the current paths in the first inner circumference coil 311a and the first outer circumference coil 312a (see the arrows in FIG. 4).

The first receiving coil 32a is formed in a circular shape between the first inner circumference coil 311a and the first outer circumference coil 312a in the first transmitting coil 31a. The first receiving coil 32a includes three receiving coil sections 321a to 323a having different phases in the rotational direction. The intersections of the receiving coil sections 321a to 323a are arranged vertically with the insulating layer 33A therebetween while being interconnected through through-holes or vias. They are thereby electrically isolated from one another.

Figure 5:
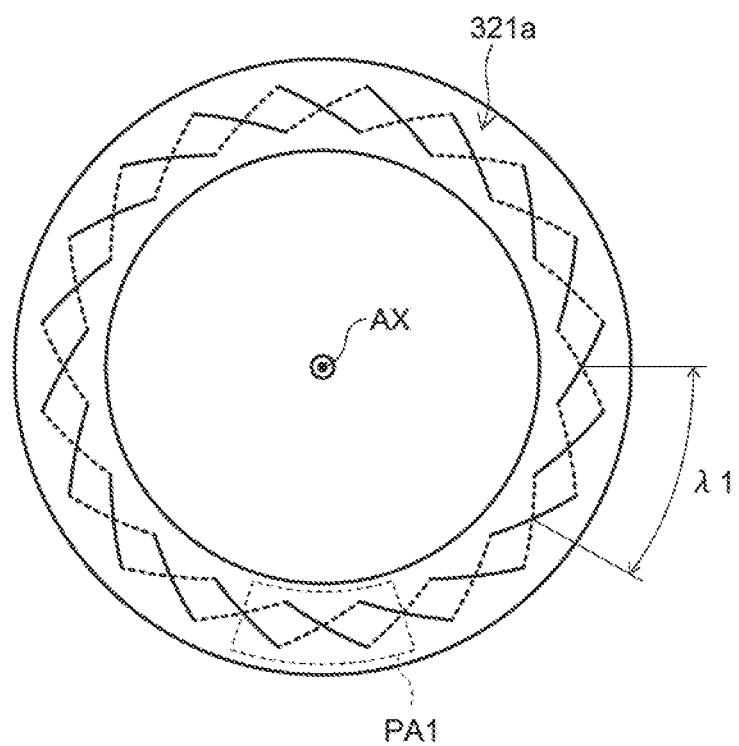
FIG. 5 is a plan view illustrating an exemplary receiving coil section in the first receiving coil.

FIG. 5 is a plan view illustrating an exemplary receiving coil section in the first receiving coil.

As illustrated in FIG. 5, the receiving coil section 321a has a looped (rhombic) pattern that periodically alters the shape at pitches $\lambda 1$ in the rotational direction of the rotor 15. Specifically, ten rhombic pattern pairs PA1 are provided in the receiving coil section 321a. Each of the receiving coil sections 322a and 323a has substantially the same shape as in the receiving coil section 321a.

Figure 6:
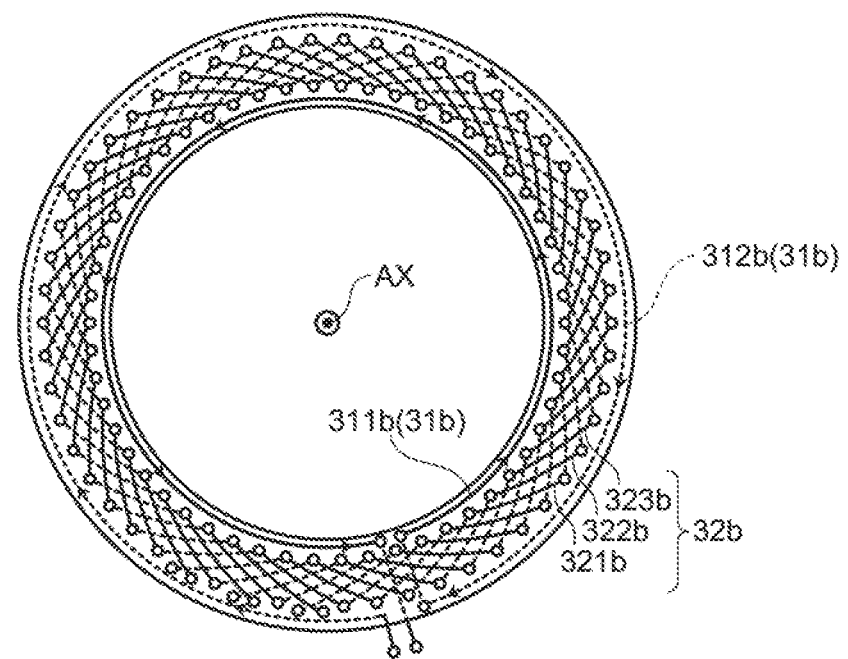
FIG. 6 is a plan view illustrating an exemplary second transmitting coil and second receiving coil.

FIG. 6 is a plan view illustrating an exemplary second transmitting coil and second receiving coil.

As illustrated in FIG. 6, the second inner circumference coil 311b and the second outer circumference coil 312b in the second transmitting coil 31b are provided coaxially with the rotation axis AX of the spindle 7. Specifically, the second inner circumference coil 311b is provided on the surface of the insulating layer 33C which faces the rotor 15; the second outer circumference coil 312b is provided on the surface of the insulating layer 33C opposite the rotor 15.

Each of the second inner circumference coil 311b and the second outer circumference coil 312b has a substantially circular current path. Current flows in the different directions through the current paths in the second inner circumference coil 311b and the second outer circumference coil 312b (see the arrows in FIG. 6).

The second receiving coil 32b that has substantially the same shape as in the first receiving coil 32a includes three receiving coil sections 321b to 323b having different phases in the rotational direction. However, each pitch of the second receiving coil 32b in the rotational direction differs from each pitch of the first receiving coil 32a in the rotational direction.

Figure 7:
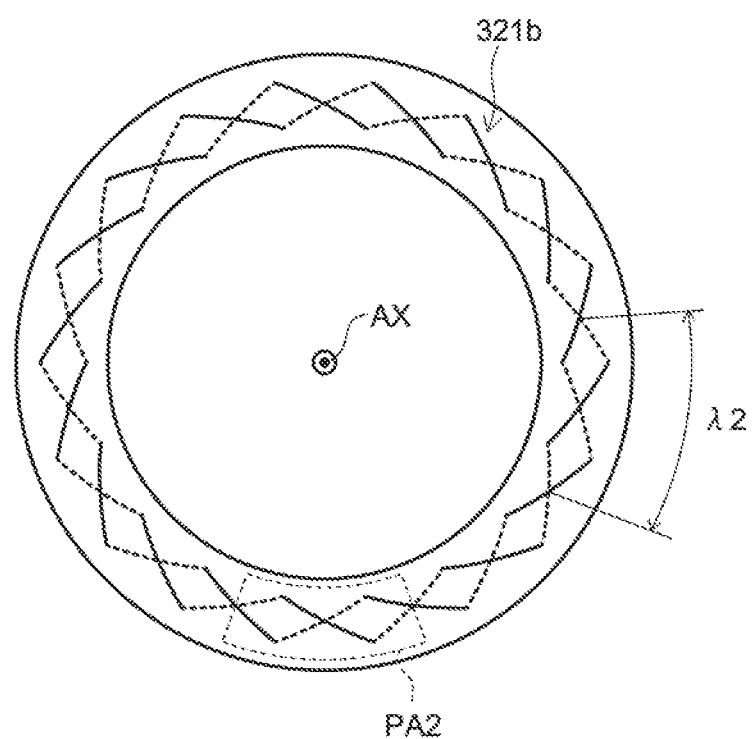
FIG. 7 is a plan view illustrating an exemplary receiving coil section in the second receiving coil.

FIG. 7 is a plan view illustrating an exemplary receiving coil section in the second receiving coil.

As illustrated in FIG. 7, the receiving coil section 321b has a looped (rhombic) pattern that periodically alters the shape at pitches $\lambda 2$ in the rotational direction of the rotor 15, and each pitch $\lambda 2$ differs from each pitch $\lambda 1$. For example, each pitch $\lambda 2$ is longer than each pitch $\lambda 1$. In other words, each pitch $\lambda 1$ is shorter than each pitch $\lambda 2$. Nine rhombic pattern pairs PA2 are provided in the receiving coil section 321b. Each of the receiving coil sections 322b and 323b has substantially the same shape as in the receiving coil section 321b.

Figure 8:
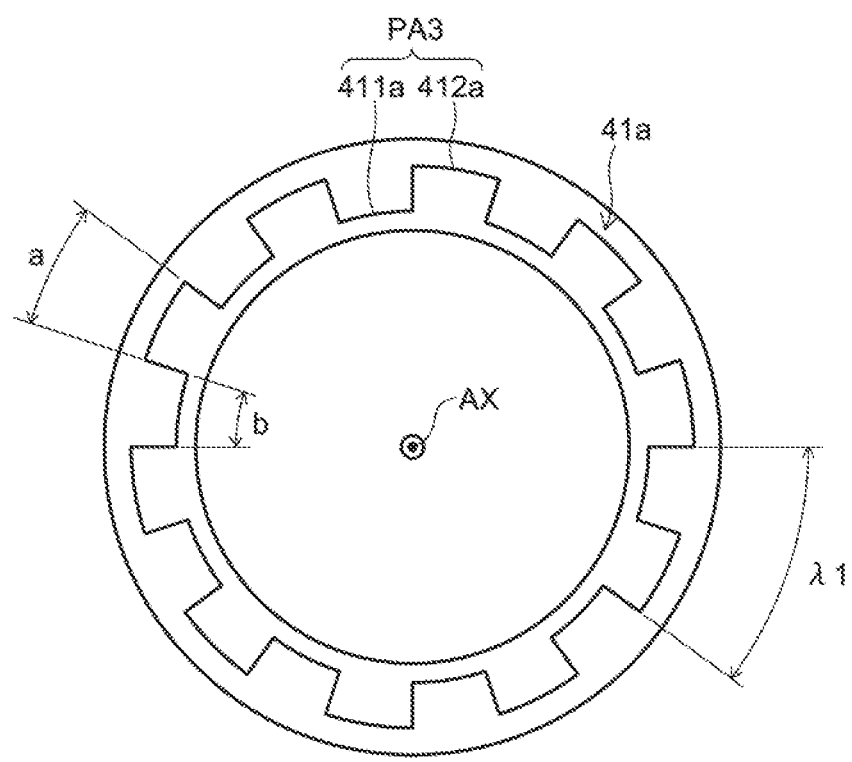
FIG. 8 is a plan view illustrating an exemplary first magnetic flux coupling body.

FIG. 8 is a plan view illustrating an exemplary first magnetic flux coupling body.

As illustrated in FIG. 8, the first magnetic flux coupling body 41a is formed over the first receiving coil 32a with a gap therebetween while being coaxially with the rotation axis AX of the spindle 7. The first magnetic flux coupling body 41a has a toothed pattern that periodically alters the shape at pitches $\lambda 1$ in the rotational direction of the rotor 15, and each of these pitches $\lambda 1$ is equal to each pitch $\lambda 1$ of the first receiving coil 32a.

The first magnetic flux coupling body 41a includes concave portions 411a and convex portions 412a arranged alternately; concave portion 411a is depressed in a direction toward the spindle 7, and each convex portion 412a protrudes in a direction away from the spindle 7. In the example of FIG. 8, ten pattern pairs PA3, each of which has the concave portion 411a and the convex portions 412a, are provided.

Figure 9:
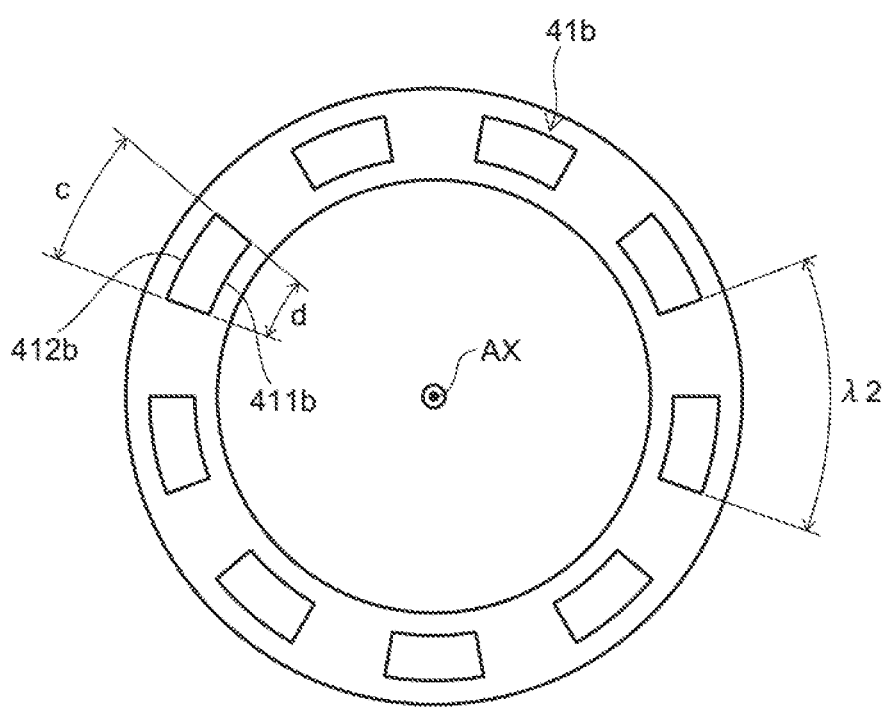
FIG. 9 is a plan view illustrating an exemplary second magnetic flux coupling body.

FIG. 9 is a plan view illustrating an exemplary second magnetic flux coupling body.

As illustrated in FIG. 9, the second magnetic flux coupling body 41b is formed coaxially with the rotation axis AX of the spindle 7. In addition, the second magnetic flux coupling body 41b includes a plurality of island-shaped patterns, or isolated, rectangular-looped patterns, arranged at regular pitches λ2 in the rotational direction of the rotor 15. In the example illustrated in FIG. 9, nine patterns are provided in the second magnetic flux coupling body 41b. In this embodiment, the first magnetic flux coupling body 41a has a toothed pattern as illustrated in FIG. 8, and the second magnetic flux coupling body 41b has island-shaped patterns as illustrated in FIG. 9. Conversely, the first magnetic flux coupling body 41a may have island-shaped patterns, and the second magnetic flux coupling body 41b may have a toothed pattern. Alternatively, they may have other shapes.

Next, a description will be given of inductive currents generated in the first magnetic flux coupling body 41a and the second magnetic flux coupling body 41b.

Figure 10A:
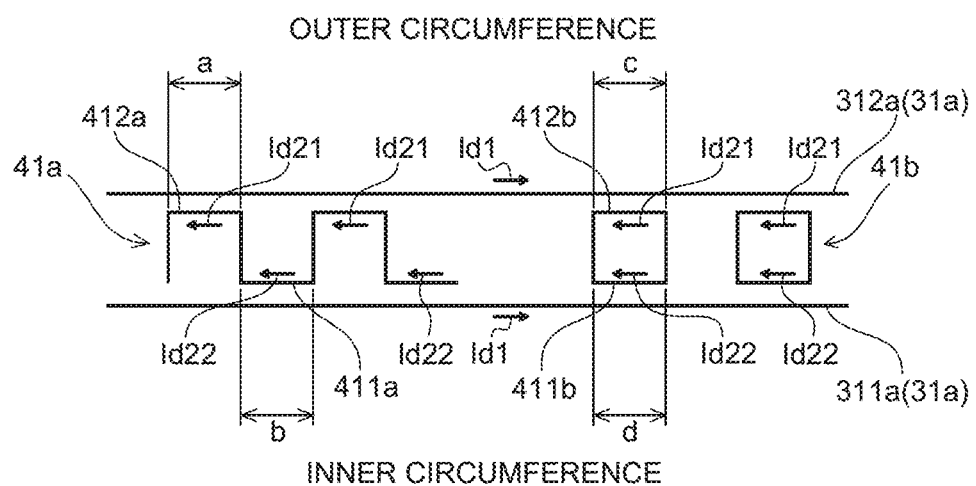
FIGS. 10A and 10B illustrate exemplary inductive currents generated from currents flowing through the first and second transmitting coils.
Figure 10B:
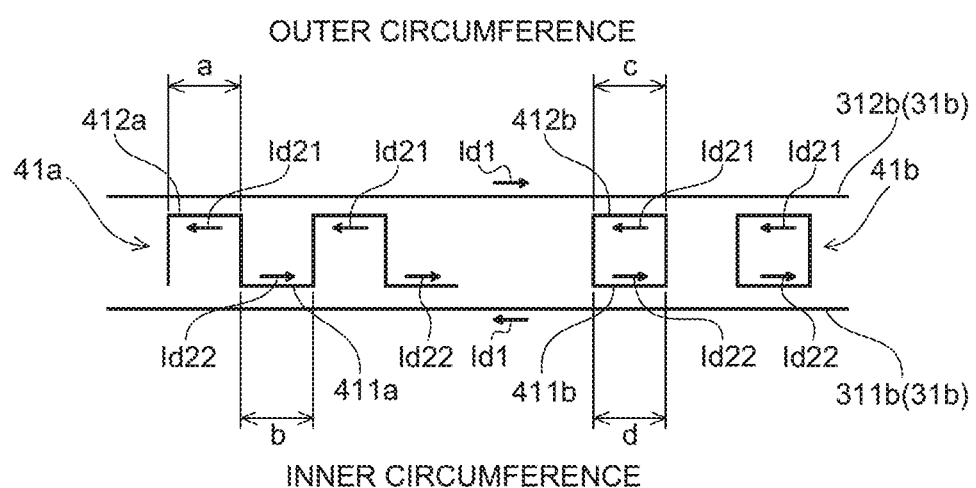

FIGS. 10A and 10B illustrate exemplary inductive currents generated from currents flowing through the first and second transmitting coils. FIG. 10A schematically illustrates inductive currents in the first magnetic flux coupling body 41a and the second magnetic flux coupling body 41b which are generated from a current Id1 flowing through the first transmitting coil 31a.

In the example illustrated in FIG. 10A, the current Id1 flows clockwise through the first inner circumference coil 311a and the first outer circumference coil 312a in the first transmitting coil 31a. Due to this current Id1, the inductive currents Id21 and Id22 flow counterclockwise through the current paths along the inner and outer circumferences of each of the first magnetic flux coupling body 41a and the second magnetic flux coupling body 41b, respectively. In this case, in the first magnetic flux coupling body 41a, the inductive currents Id21 and Id22 are not mutually cancelled because the current path is not looped. In contrast, in the second magnetic flux coupling body 41b, the inductive currents Id21 and Id22 are mutually cancelled because each current path is looped.

In the second magnetic flux coupling body 41b, the current path length d of each inner side 411b corresponding to the inner segment is shorter than the current path length c of each outer side 412b corresponding to the outer segment. In this embodiment, the closest distance between the second magnetic flux coupling body 41b and the first inner circumference coil 311a in the first transmitting coil 31a is set to be shorter than the closest distance between the second magnetic flux coupling body 41b and the first outer circumference coil 312a.

This setting of the closest distance (referred to below as a "distance-related setting") adjusts the respective strengths of magnetic flux couplings to each inner side 411b and each outer side 412b in the second magnetic flux coupling body 41b, reducing the difference between the inductive currents Id21 and Id22. Consequently, even if the length d is shorter than the length c, it is possible to reduce the difference between the inductive currents which would be caused due to this length difference. This enables the inductive currents to be mutually cancelled, reducing a crosstalk.

FIG. 10B schematically illustrates inductive currents in the first magnetic flux coupling body 41a and the second magnetic flux coupling body 41b which are generated from the current Id1 flowing through the second transmitting coil 31b. In the example illustrated in FIG. 10B, the current Id1 flows clockwise and counterclockwise through the second outer circumference coil 312b and the second inner circumference coil 311b, respectively, in the second transmitting coil 31b.

Due to the above current Id1, the inductive currents Id21 flow counterclockwise through the outer current paths in the first magnetic flux coupling body 41a and the second magnetic flux coupling body 41b. In addition, the inductive currents Id22 flows clockwise through the inner current paths therein.

In this case, in the first magnetic flux coupling body 41a, the inductive currents Id21 and Id22 are mutually cancelled on the non-looped current path. In contrast, in the second magnetic flux coupling body 41b, the inductive currents Id21 and Id22 are not mutually cancelled on the looped current paths.

In the first magnetic flux coupling body 41a, the current path length b of each concave portion 411a corresponding to the inner segment is shorter than the current path length a of each convex portion 412a corresponding to the outer segment. In this embodiment, the closest distance between the first magnetic flux coupling body 41a and the second inner circumference coil 311b in the second transmitting coil 31b is set to be shorter than the closest distance between the first magnetic flux coupling body 41a and the second outer circumference coil 312b.

This distance-related setting adjusts the respective strengths of magnetic flux couplings to each concave portion 411a and each convex portion 412a in the first magnetic flux coupling body 41a, reducing the difference between the inductive currents Id21 and Id22. Consequently, even if the length b is shorter than the length a, it is possible to reduce the difference between the inductive currents which would be caused due to this length difference. This enables the inductive currents to be mutually cancelled, reducing a crosstalk.

In order to adjust the difference between inductive currents in an induction detecting type rotary encoder 11 which may cause a crosstalk, it is only necessary to adjust the layout of a first transmitting coil 31a and a second transmitting coil 31b in a direction along a rotation axis AX. This adjustment exerts little influence on the outer diameters of the stator 13 and the rotor 15.

The distance-related setting described above is desirably made such that the difference between inductive currents Id21 and Id22 is decreased to substantially zero. This reduces a crosstalk occurring when inductive currents Id21 and Id22 are mutually cancelled in each of a first magnetic flux coupling body 41a and a second magnetic flux coupling body 41b. In this way, the inductive currents Id21 and Id22 can be mutually cancelled completely. Note that a first inner circumference coil 311a and a first outer circumference coil 312a may be embedded in the same insulating layer. In this case, they need to be positioned at different locations in a direction along a rotation axis AX (in the same insulating layer at different depths). Likewise, a second inner circumference coil 311b and a second outer circumference coil 312b may be embedded in the same insulating layer. In this case, they need to be positioned at different locations in a direction along the rotation axis AX (in the same insulating layer at different depths).

Second Embodiment

Next, a second embodiment of the present invention will be described below with reference to the accompanying drawing.

Figure 11:
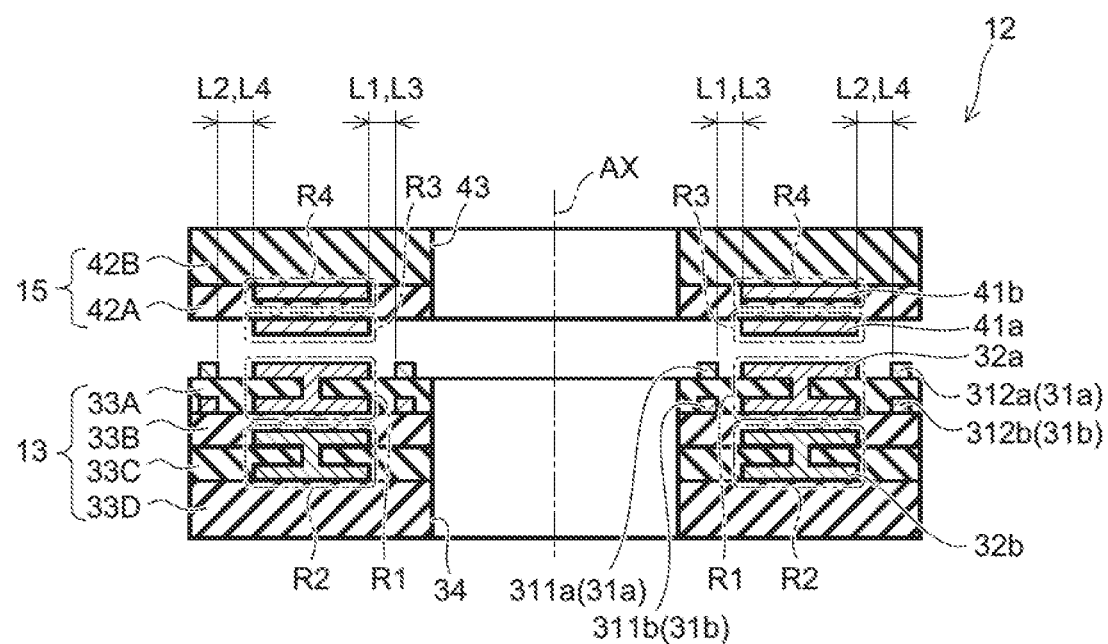
FIG. 11 is a schematic cross section view illustrating an exemplary configuration of an induction detecting type rotary encoder in a second embodiment of the present invention.
Figure 12A:
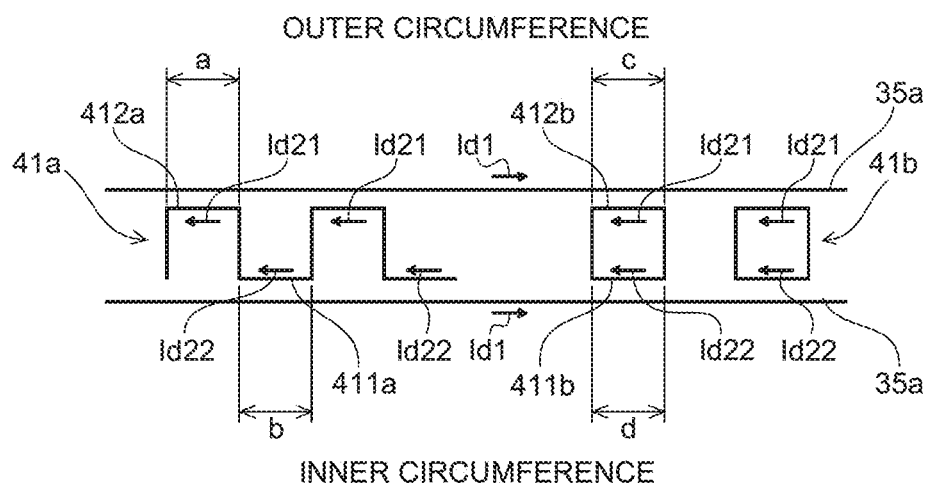
FIGS. 12A and 12B illustrate exemplary inductive currents generated from currents flowing through conventional first and second transmitting coils.
Figure 12B:
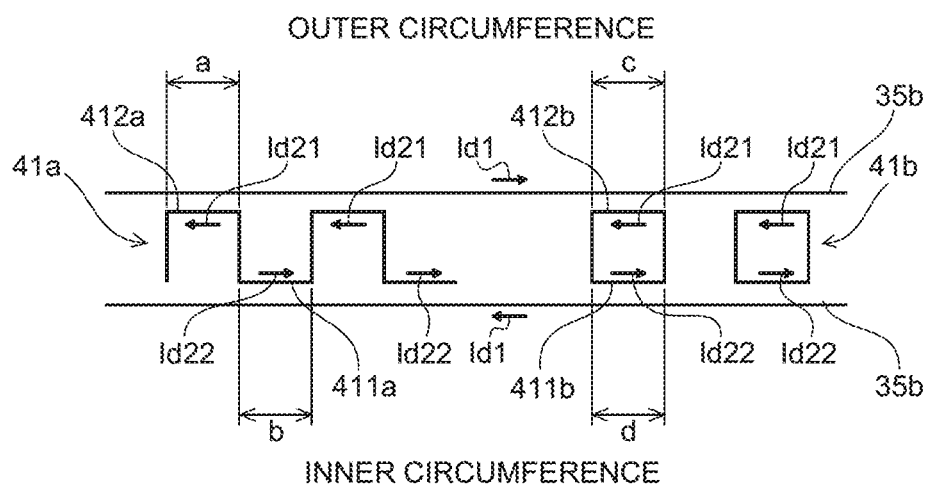

FIG. 11 is a schematic cross section view illustrating an exemplary configuration of an induction detecting type rotary encoder in a second embodiment of the present invention As illustrated in FIG. 11, an induction detecting type rotary encoder 12 includes a first inner circumference coil 311a and a first outer circumference coil 312a that are formed on the same layer. In addition, the induction detecting type rotary encoder 12 further includes a second inner circumference coil 311b and a second outer circumference coil 312b that are formed on the same layer. Other components have the same structure as those of the induction detecting type rotary encoder 11 in the first embodiment.

In the induction detecting type rotary encoder 12, both of the first inner circumference coil 311a and the first outer circumference coil 312a are formed on the surface of the insulating layer 33A which faces the rotor 15. Both of the second inner circumference coil 311b and the second outer circumference coil 312b are formed on the surface of the insulating layer 33B opposite the rotor 15.

Although both the first inner circumference coil 311a and the first outer circumference coil 312a are formed on the same layer, the closest distance between the first inner circumference coil 311a and a second magnetic flux coupling body 41b is set to be shorter than the closest distance between the first outer circumference coil 312a and the second magnetic flux coupling body 41b. In addition, the closest distance between the second inner circumference coil 311b and a first magnetic flux coupling body 41a is set to be shorter than the closest distance between the second outer circumference coil 312b and the first magnetic flux coupling body 41a.

More specifically, a spacing L1 between the first inner circumference coil 311a and the second magnetic flux coupling body 41b is set to be smaller, in a direction perpendicular to a rotation axis AX, than a spacing L2 between the first outer circumference coil 312a and the second magnetic flux coupling body 41b. For that purpose, the respective distances between the first inner circumference coil 311a and the second magnetic flux coupling body 41b and between the first outer circumference coil 312a and the second magnetic flux coupling body 41b are adjusted in a direction along the surface of the insulating layer 33A.

Likewise, a spacing L3 between the second inner circumference coil 311b and the first magnetic flux coupling body 41a is set to be smaller, in the direction perpendicular to the rotation axis AX, than a spacing L4 between the second outer circumference coil 312b and the first magnetic flux coupling body 41a. For that purpose, the respective distances between the second inner circumference coil 311b and the first magnetic flux coupling body 41a and between the second outer circumference coil 312b and the first magnetic flux coupling body 41a are adjusted in a direction along the surface of the insulating layer 33B.

Not only the foregoing induction detecting type rotary encoder 11 but also the induction detecting type rotary encoder 12 can reduce a crosstalk occurring when inductive currents are mutually cancelled, which would be caused due to the respective differences in length between the inner and outer circumferences of the first magnetic flux coupling body 41a and between the inner and outer circumferences of the second magnetic flux coupling body 41b.

In order to adjust the difference between inductive currents in the induction detecting type rotary encoder 12 which may cause a crosstalk, it is only necessary to adjust the layout of the first transmitting coil 31a and the second transmitting coil 31b in directions along the surfaces of corresponding insulating layers. In this way, the distance-related setting can be made easily.

As described above, some embodiments of the present invention provide induction detecting type rotary encoders 11 and 12 that are capable of reducing a crosstalk occurring when inductive currents are mutually cancelled in each magnetic flux coupling body, thereby enabling highly accurate location detection.

The present invention is not limited to embodiments as described above. For example, a first inner circumference coil 311a and a first outer circumference coil 312a may be provided on different layers. In this case, by arranging them in a direction perpendicular to a rotation axis AX, the balance between inductive currents Id21 and Id22 flowing through a first magnetic flux coupling body 41a may be adjusted. Likewise, a second inner circumference coil 311b and a second outer circumference coil 312b may be provided on different layers. In this case, by arranging them in a direction perpendicular to the rotation axis AX, the balance between inductive currents Id21 and Id22 flowing through a second magnetic flux coupling body 41b may be adjusted. Moreover, each pitch λ1 may be set longer than each pitch λ2. It should be noted that modifications and variations in embodiments as described above which those skilled in the art could conceive of by: adding or deleting constituent elements; changing their designs; or combining features of embodiments as appropriate fall within the scope of the present invention, provided that they contain the spirits of the present invention.

INDUSTRIAL APPLICABILITY

As described above, the present invention is applicable suitably to digital micrometers, digital indicators and other measuring instruments that read a measurement value by detecting a rotation amount.

What is claimed is:
1. An induction detecting type rotary encoder comprising:
a stator;
a rotor disposed opposite the stator, the rotor being rotatable around a rotation axis;
a first transmitting coil provided in the stator, the first transmitting coil including a first inner circumference coil and a first outer circumference coil that allow respective currents to flow therethrough in the same rotational direction while being centered on the rotation axis;
a second transmitting coil provided in the stator, the second transmitting coil including a second inner circumference coil and a second outer circumference coil that allow respective currents to flow therethrough in different rotational directions while being centered on the rotation axis;
a first receiving coil provided in the stator, the first receiving coil being formed in a circular first region at a center of which the rotation axis is positioned;
a second receiving coil provided in the stator, the second receiving coil being formed in a circular second region, the second region being disposed over or under the first region in a direction along the rotation axis, a first insulating layer being interposed between the first receiving coil and the second receiving coil;
a first magnetic flux coupling body provided in the rotor, the first magnetic flux coupling body being formed in a circular third region at a center of which the rotation axis is positioned; and
a second magnetic flux coupling body provided in the rotor, the second magnetic flux coupling body being formed in a circular fourth region, the fourth region being disposed over or under the third region in the direction along the rotation axis, a second insulating layer being interposed between the first magnetic flux coupling body and the second magnetic flux coupling body, wherein the closest distance between the first inner circumference coil and the second magnetic flux coupling body is shorter than the closest distance between the first outer circumference coil and the second magnetic flux coupling body, and the closest distance between the second inner circumference coil and the first magnetic flux coupling body is shorter than the closest distance between the second outer circumference coil and the first magnetic flux coupling body.

2. The induction detecting type rotary encoder according to claim 1, wherein a spacing between the first inner circumference coil and the second magnetic flux coupling body is smaller, in the direction along the rotation axis, than a spacing between the first outer circumference coil and the second magnetic flux coupling body, and a spacing between the second inner circumference coil and the first magnetic flux coupling body is smaller, in the direction along the rotation axis, than a spacing between the second outer circumference coil and the first magnetic flux coupling body.

3. The induction detecting type rotary encoder according to claim 1, wherein the first transmitting coil and at least one of the first receiving coil and the second receiving coil are provided on the same layer, and the second transmitting coil and at least one of the first receiving coil and the second receiving coil are provided on the same layer.

4. The induction detecting type rotary encoder according to claim 1, wherein a spacing between the first inner circumference coil and the second magnetic flux coupling body is smaller, in a direction perpendicular to the rotation axis, than a spacing between the first outer circumference coil and the second magnetic flux coupling body, and a spacing between the second inner circumference coil and the first magnetic flux coupling body is smaller, in the direction perpendicular to the rotation axis, than a spacing between the second outer circumference coil and the first magnetic flux coupling body.

5. The induction detecting type rotary encoder according to claim 1, wherein each of the first magnetic flux coupling body and the first receiving coil is provided such that its shape periodically alters at first pitches in the rotational direction while being centered on the rotation axis, and each of the second magnetic flux coupling body and the second receiving coil is provided such that its shape periodically alters at second pitches in the rotational direction while being centered on the rotation axis, each second pitch differing from each first pitch.

6. The induction detecting type rotary encoder according to claim 5, wherein one of the first magnetic flux coupling body and the second magnetic flux coupling body has a pattern formed of convex portions and concave portions arranged periodically, the pattern containing an inner circumference current path and an outer circumference current path, and the other of the first magnetic flux coupling body and the second magnetic flux coupling body has a plurality of island-shaped patterns arranged periodically, each island-shaped pattern forming a looped current path.

* * * * *